(12) United States Patent  (10) Patent No.: US 9,208,660 B2
Cho et al.  (45) Date of Patent:  Dec. 8, 2015

(54) DOCKING DEVICE FOR CREDIT CARD PAYMENT AND CASH DRAWER INCLUDING THE SAME

(71) Applicant: BSM CASH DRAWER CO., LTD., Paju-si (KR)

(72) Inventors: Jung Woo Cho, Goyang-si (KR); Sung Woo Cho, Seoul (KR)

(73) Assignee: BSM CASH DRAWER CO., LTD. (KR)

( * ) Notice: Subject to any disclaimer, the term of this patent is extended or adjusted under 35 U.S.C. 154(b) by 0 days.

(21) Appl. No.: 14/174,201

(22) Filed: Feb. 6, 2014

(65) Prior Publication Data

US 2015/0221187 A1  Aug. 6, 2015

(51) Int. Cl.
  *G01G 1/00* (2006.01)
  *G07G 1/00* (2006.01)
  *F16M 11/18* (2006.01)
  *G07G 1/12* (2006.01)

(52) U.S. Cl.
  CPC .............. *G07G 1/0018* (2013.01); *F16M 11/18* (2013.01); *G07G 1/0027* (2013.01); *G07G 1/12* (2013.01)

(58) Field of Classification Search
  CPC ...... G07G 1/0018; G07G 1/0027; G07G 1/12; F16M 11/18
  See application file for complete search history.

(56) References Cited

U.S. PATENT DOCUMENTS

2005/0243504 A1* 11/2005 Wong et al. .................. 361/683
2013/0299652 A1* 11/2013 Graham ....................... 248/205.1
2014/0330729 A1* 11/2014 Colangelo ..................... 705/72

FOREIGN PATENT DOCUMENTS

| KR | 100625507 B1 | 9/2006 |
| KR | 100998352 B1 | 11/2010 |
| KR | 1020110081018 | 7/2011 |
| KR | 101169059 | 7/2012 |

* cited by examiner

*Primary Examiner* — Kristy A Haupt
(74) *Attorney, Agent, or Firm* — Cantor Colburn LLP

(57) ABSTRACT

A docking device for a credit card payment includes a base and a support plate configured to accommodate a smart pad and to slide on the base. When the support plate slides from one side to the other side, the smart pad accommodated on the support plate changes from one state of being inclined toward one person located at the one side to the other state of being inclined toward the other person located at the other side.

14 Claims, 6 Drawing Sheets

(a)

(b)

DOCKING DEVICE FOR CREDIT CARD PAYMENT AND CASH DRAWER INCLUDING THE SAME

BACKGROUND

1. Field

One or more embodiments of the present invention relate to a docketing device for a credit card payment and a cash drawer including the same.

2. Description of the Related Art

In general, a credit card payment device includes a point of sale (POS) terminal, a POS printer, a cash drawer for storing cash, etc. These elements are installed on a counter where a payment is made. The POS terminal is provided with a sign pad for inputting payment information, and the sign pad was separated from a display unit for displaying details of payment.

However, since a conventional credit card payment device and a cash drawer including the same separately include a monitor viewed by a seller and a sign pad for inputting a signature of a buyer, a configuration of a credit card payment device is complicated and may deteriorate the external appearance of the credit card payment device.

SUMMARY

One or more embodiments of the present invention include a docketing device for a credit card payment having a simple structure and fine appearance, and a cash drawer including the same.

Additional aspects will be set forth in part in the description which follows and, in part, will be apparent from the description, or may be learned by practice of the presented embodiments.

According to one or more embodiments of the present invention, a docking device for a credit card payment includes a base and a support plate configured to accommodate a smart pad and to slide on the base, in which, when the support plate slides from one side to the other side, the smart pad accommodated on the support plate changes from one state of being inclined toward one person located at the one side to the other state of being inclined toward the other person located at the other side.

The docket device for a credit card payment may further include a moving unit configured to move the support plate so as to semi-automatically slide.

The docket device for a credit card payment may further include a connector cable configured to be detachably connected to the smart pad to supply electric energy and extends to the outside via the base.

The base may include a convex upper surface, and an inclination state of the smart pad accommodated on the support plate changes as the support plate moves along the convex upper surface of the base.

The docket device for a credit card payment may further include a plate having an upper surface to which the base is detachably coupled.

The docket device for a credit card payment may further include a card reader configured to be connected to the smart pad.

The support plate may be configured to move on an upper surface of the base and supports a center of mass of the smart pad.

According to one or more embodiments of the present invention, a cash drawer includes a housing, a drawer provided in the housing, and a docking device for a credit card payment that is arranged on an upper surface of the housing, the docking device for a credit card payment including a base and a support plate configured to accommodate a smart pad and to slide on the base, in which, when the support plate slides from one side to the other side, the smart pad accommodated on the support plate changes from one state of being inclined toward one person located at the one side to the other state of being inclined toward the other person located at the other side.

The cash drawer may further include a first port arranged in the housing and configured to receive external electric energy, and a second port arranged in the housing and electrically connected to the first port, the second port configured to be electrically connected to the smart pad.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
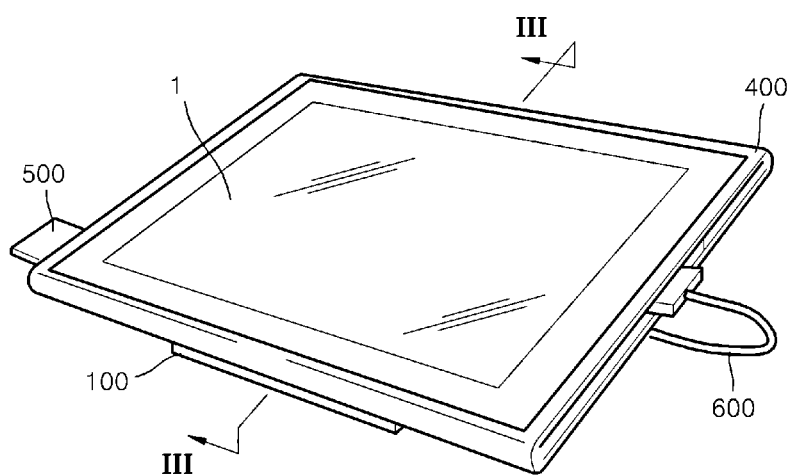
FIGS. 1 and 2 are perspective views schematically illustrating a docking device for a credit card payment, according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

In the following description, a smart pad 1 refers to a device having a large screen and equipped with a mobile operating system, such as, iPad by Apple Inc., Galaxy Tab by Samsung Electronics Co., Ltd., or is called a tablet PC.

Figure 2:
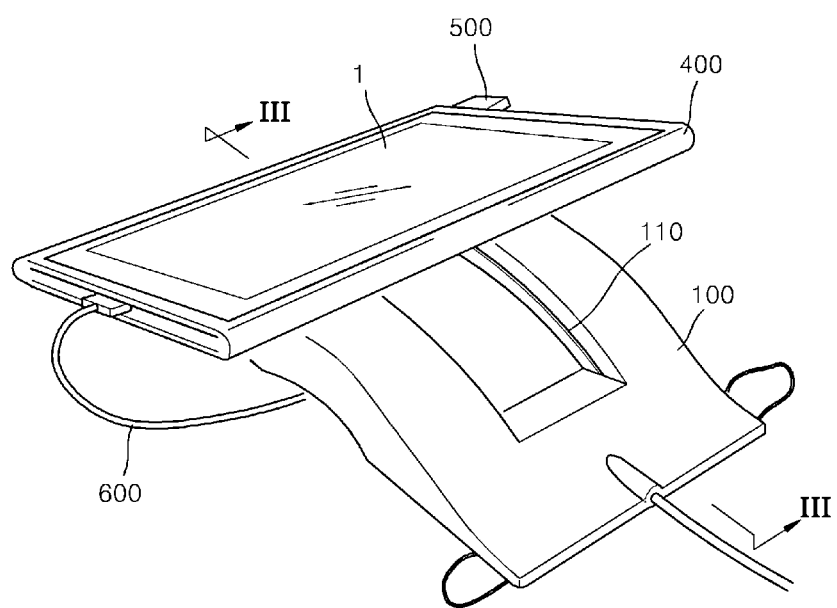
Figure 3:
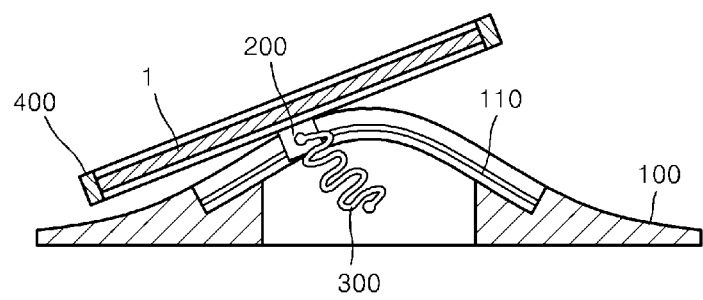
FIGS. 3A and 3B are cross-sectional views taken along line III-Ill of FIGS. 1 and 2, schematically illustrating an operation of the docking device for a credit card payment of FIGS. 1 and 2.
Figure 3:
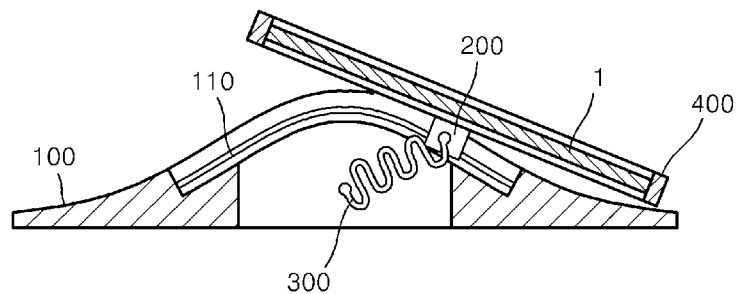

FIG. 1 is a perspective view schematically illustrating a docking device for a credit card payment, according to an embodiment of the present invention. FIG. 2 is a perspective view schematically illustrating the docking device for a credit card payment of FIG. 1A, viewed from a different direction. FIGS. 3A and 3B are cross-sectional views taken along line III-III of FIGS. 1 and 2, respectively. A docking device for a credit card payment is equipped with the smart pad 1 and used to make a payment with a credit card, that is, a docking device for a credit card payment using the smart pad 1. In other words, the docking device for a credit card payment, according to the present invention, may be interpreted as a smart pad docking device. The docking device for a credit card payment may include a base 100, a support plate 200, and a moving unit 300.

Elements of the docking device for a credit card payment, according to the present embodiment, may be arranged on or coupled to the base 100. In other words, the base 100 may be disposed at the lowermost position among the constituent elements forming the docking device for a credit card payment. The base 100 may be arranged on, for example, a table or a cash drawer 800 (see FIGS. 5 and 6), or fixed thereto or integrally formed therewith. To this end, a bottom surface of the base 100 may be substantially flat. However, the present invention is not limited thereto and the bottom surface of the base 100 may have a variety of shapes.

The support plate 200 may be slidably coupled to the base 100 and may accommodate the smart pad 1. In other words, the support plate 200 may be provided between the base 100 and the smart pad 1. For example, the support plate 200 may be moved in one direction or a reverse direction with respect to the base 100 that is fixed. In detail, the support plate 200 may be arranged on an upper surface of the base 100 and may be slidable on the base 100 in one direction and a reverse direction.

In order to enable the support plate 200 to slidably move on the base 100, the base 100 may include a long rail extending in one direction and the support plate 200 may be movably coupled to the rail. In order to prevent the support plate 200 from being unintentionally detached from the base 100, a rib 110 may be formed on the base 100, and one of the support plate 200 and the rib 110 may be inserted into the other or coupled with the other.

The support plate 200 may support the center of mass of the smart pad 1. For example, since the smart pad 1 may substantially have a rectangular panel shape, the center of mass of the smart pad 1 may approximately be around the center of the smart pad 1. The smart pad 1 may be accommodated on the support plate 200 such that a center portion of the smart pad 1 is supported on the support plate 200.

Also, the support plate 200 may be moved on the upper surface of the base 100 as described later. In other words, in the docking device for a credit card payment according to the present embodiment, the base 100, the support plate 200, and the smart pad 1 may be sequentially stacked, to prevent the support plate 200 from being damaged due to moment generated when the smart pad 1 moves. For example, when the support plate 200 supports an eccentric portion, not a center portion, of the smart pad 1, such as a corner of the smart pad 1, a moment is generated by a force applied by a user or gravity and thus the support plate 200 may be damaged. According to the present embodiment, the support plate 200 may support the center of mass portion of the smart pad 1 to reduce the generation of a moment and thus prevent damage to the support plate 200.

The smart pad 1 may be directly attached on the support plate 200 by using an adhesive. However, in order to more firmly accommodate the smart pad 1 on the support plate 200 to protect the smart pad 1 or to enable the smart pad 1 to be detachable from the support plate 200 as necessary, the docking device for a credit card payment may further include a cover 400 with which the smart pad 1 is detachably coupled.

The cover 400 may cover a portion of the smart pad 1, particularly the outer circumferential surface of the smart pad 1 and an opposite surface of a display surface of the smart pad 1. In other words, the cover 400 may cover the smart pad 1 in a manner that the display panel of the smart pad 1 is exposed. Also, the cover 400 may cover the smart pad 1 in a manner that an earphone socket and a connecter of the smart pad 1 are exposed. The cover 400 may be fixed to or detachably coupled to the support plate 200.

When a seller or a service provider (hereinafter, referred to as the seller) operates the smart pad 1 for a payment and a buyer who makes a payment signs on the display panel of the smart pad 1, since the positions of the seller and the buyer are far from each other, the smart pad 1 needs to be moved to a position adjacent to the seller or the buyer. In other words, on a counter of a variety of types of stores, the seller and the buyer are usually at the opposite sides with respect to the docking device for a credit card payment. When the seller operates the smart pad 1 for a payment, the smart pad 1 needs to be inclined toward the seller so that the seller may easily use the smart pad 1. When the buyer signs on the smart pad 1 or checks payment information on the smart pad 1, the smart pad 1 needs to be inclined toward the buyer so that the buyer may easily use the smart pad 1.

In this case, although the support plate 200 may be manually moved on the base 100 between the seller and the buyer, the support plate 200 may be semi-automatically moved to improve user convenience. Accordingly, the docking device for a credit card payment may further include the moving unit 300 for semi-automatically and slidably moving the support plate 200 where the smart pad 1 is mounted.

The moving unit 300 may semi-automatically move the support plate 200 to an opposite side when a user applies a force over a predetermined amount to the support plate 200 or moves the support plate 200 in a preset direction by a predetermined distance. When a user applies a force over a predetermined amount to the support plate 200 or moves the support plate 200 in a preset direction by a predetermined distance, the moving unit 300 semi-automatically moves the support plate 200 to the opposite side, which may be referred to as semi-automatic sliding. The semi-automatic sliding may be electronically or mechanically performed.

In the following description, a configuration of moving the moving unit 300 from one side to the opposite side without having to apply a further force when the support plate 200 disposed between the one side and the opposite side is moved by a predetermined distance by a user will be described with reference to FIGS. 3A and 3B.

The moving unit 300 may include an elastic member provided between the support plate 200 and the base 100. One end of the elastic member may be fixed to the support plate 200 and the other end thereof may be fixed to the base 100. As illustrated in FIGS. 3A and 3B, one end of the elastic member may be fixedly coupled to approximately a center portion of the support plate 200 and the other end thereof may be fixedly coupled to approximately a center portion of the base 100. The moving unit 300 may semi-automatically move the support plate 200 in opposite directions, to semi-automatically move the smart pad 1 in a direction from the seller toward the buyer or vice versa.

When the seller pushes the support plate 200 to approximately a center portion of the base 100 from one side, the support plate 200 may be semi-automatically moved to the other side by elasticity of the moving unit 300. Also, when the buyer pushes the support plate 200 to approximately the center portion of the base 100 from the other side, the support plate 200 may be semi-automatically moved to the one side by elasticity of the moving unit 300.

Although the elastic member is used as the moving unit 300 that semi-automatically moves the support plate 200, the present invention is not limited thereto and other semi-automatic slide units may be employed therefor. For example, a configuration may be employed, by which, when the seller slightly pushes the support plate 200 toward a position where the seller is located or slightly pushes the support plate 200 downward, the support plate 200 automatically slides toward a position where the buyer is located and, when the buyer slightly pushes the support plate 200 toward a position where the buyer is located or slightly pushes the support plate 200 downward, the support plate 200 automatically slides toward a position where the seller is located. Alternatively, a variety of configurations such as a semi-automatic sliding configuration for a mobile phone may be employed.

The smart pad 1 may be inclined toward the seller or the buyer to facilitate the seller's or the buyer's view of the smart pad 1 or information input to the smart pad 1. To this end, the base 100 may have a convex upper surface and the support plate 200 may move along the convex upper surface of the base 100.

For example, the upper surface of the base 100 may be convex at the center of the base 100, that is, the thickness of the base 100 may increase and then decrease along a movement path of the support plate 200. In other words, the thickness of the base 100 gradually increases from any one side thereof toward the center thereof along the movement path of the support plate 200 and gradually decreases from the center thereof toward the other side thereof along the movement path of the support plate 200.

As the support plate 200 moves along an inclined surface of the base 100, the display surface of the smart pad 1 may be smoothly inclined toward the seller at the seller's side and toward the buyer at the buyer's side. In other words, when the support plate 200 slides from the seller's side to the buyer's side, the smart pad 1 mounted on the support plate 200 may be inclined toward the buyer. As the support plate 200 moves along the convex upper surface of the base 100, the state of inclination of the smart pad 1 mounted on the support plate 200 changes accordingly.

A card reader 500 for a credit card payment may be connected to the smart pad 1. For example, the card reader 500 may read an IC card or a magnetic card. The smart pad 1 may include an earphone socket where earphones or headphones may be connected. The card reader 500 may be connected to the earphone socket of the smart pad 1.

Since the earphone socket is normally circular, the card reader 500 connected to the earphone socket only may be rotated. To prevent the card reader 500 from rotating, the card reader 500 may be detachably coupled to the cover 400 so as to be supported by the cover 400.

When the smart pad 1 is used for a long time, there is a need to supply separate electric energy to the smart pad 1. Accordingly, the docking device for a credit card payment may further include a connector cable 600 extending outside via the base 100 and configured to supply electric energy to the smart pad 1. For example, one end of the connector cable 600 may be connected to a connector of the smart pad 1 and the other end thereof may be connected to a power source device. The power source device may be, for example, a plug receptacle or the cash drawer 800.

The connector cable 600 may be detachably coupled to the cover 400 and supported by the cover 400 so as to be more firmly connected to the connector or the smart pad 1. Accordingly, the connector of the smart pad 1 may be prevented from being damaged and discontinued supply of electric energy to the smart pad 1 due to unintentional removal of the connector cable 600 may be prevented.

The docking device for a credit card payment may print payment information by transmitting a signal to a printed by using a wireless communication method, such as Bluetooth, supported by the smart pad 1.

Figure 4:
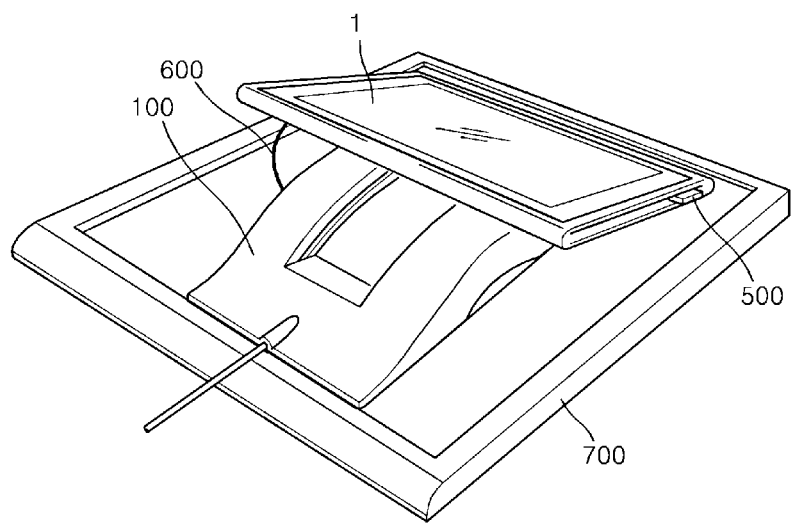
FIG. 4 is a perspective view schematically illustrating the docking device for a credit card payment of FIGS. 1 and 2 and a plate to which the docking device for a credit card payment is coupled.

FIG. 4 is a perspective view schematically illustrating a plate 700 to which the docking device for a credit card payment of FIGS. 1 and 2 is coupled.

The docking device for a credit card payment, in particular the base 100, may be detachably coupled to an upper surface of the plate 700. The coupling of the plate 700 and the base 100 may include that the base 100 is placed on the plate 700. Accordingly, the plate 700 may prevent simultaneous movement of the base 100 when the support plate 200 is moved.

Figure 5:
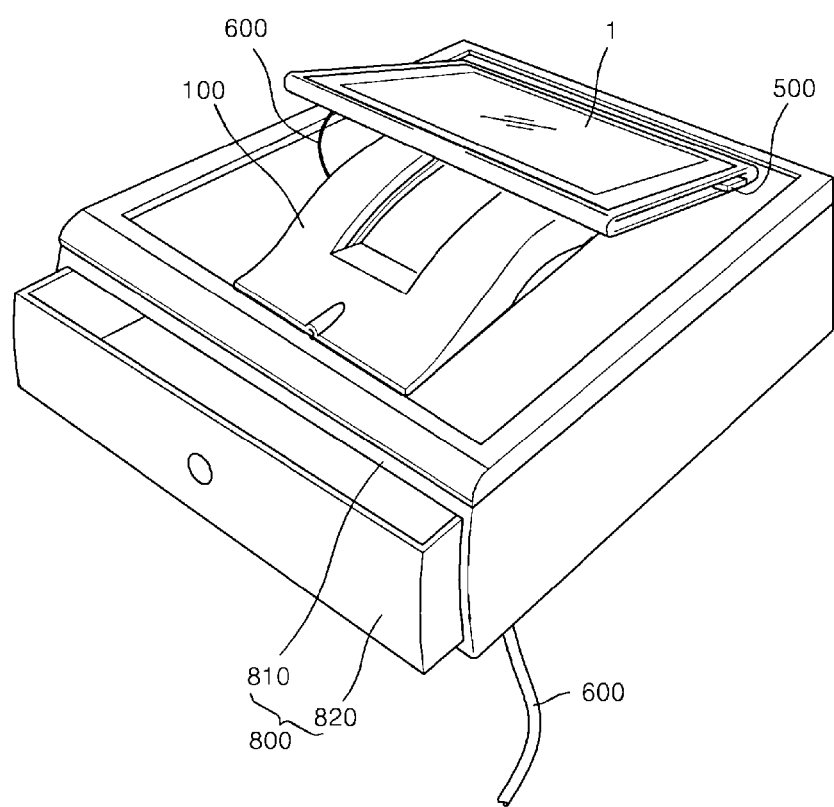
FIG. 5 is a perspective view schematically illustrating a cash drawer according to an embodiment of the present invention.

FIG. 5 is a perspective view schematically illustrating an integrated cash drawer according to an embodiment of the present invention, including the docking device for a credit card payment of FIGS. 1 and 2, a housing 810, and a drawer 820. Conventionally, a cash drawer 800 includes the housing 810 forming an outer appearance and the drawer 820 that is movable and stores cash in the housing 810. The integrated cash drawer according to the present embodiment comprises the conventional cash drawer 800 and the docking device for a credit card payment.

The docking device for a credit card payment may be arranged on an upper surface of the cash drawer 800. The docking device for a credit card payment may be arranged directly on an upper surface of the cash drawer 800 or on the plate 700 that is arranged on the upper surface of the cash drawer 800.

The connector cable 600 that may be connected to the smart pad 1 of the docking device for a credit card payment may extend outside via the cash drawer 800. For example, the connector cable 600 may be inserted through a center portion of the housing 810, extend to a corner portion of the housing 810, and extend outside from the corner portion of the housing 810. In another example, the connector cable 600 may be inserted through an upper surface of a corner portion of the housing 810 and extend outside from a lower surface corresponding to the upper surface through which the connector cable 600 is inserted.

Figure 6:
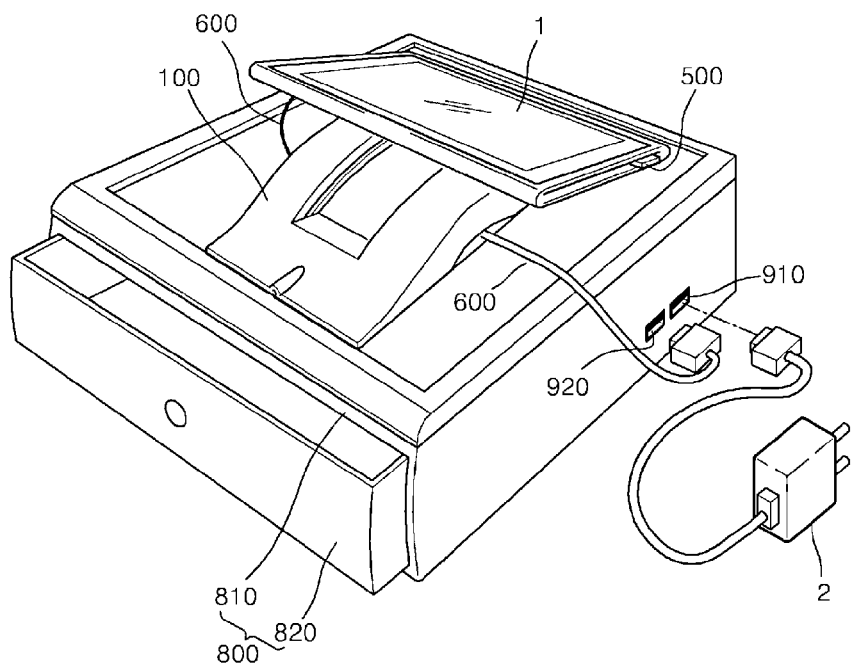
FIG. 6 is a perspective view schematically illustrating a cash drawer according to another embodiment of the present invention.

FIG. 6 is a perspective view schematically illustrating an integrated cash drawer according to another embodiment of the present invention. Referring to FIG. 6, a first port 910 and a second port 920 may be provided at one side of the housing 810. The first port 910 may receive external electric energy. For example, the first port 910 is a USB port and may receive electricity through an adaptor 2 plugged in an external power source device such as a plug receptacle. The adaptor 2 may be one that is generally used for the smart pad 1. A connector for connecting the adaptor 2 and the first port 910 may be one that is generally used for the smart pad 1.

The second port 920 may be electrically connected to the first port 910 and the smart pad 1. For example, the second port 920 is a USB port and may be electrically connected to the first port 910 by wiring in the housing 810. Also, the second port 920 may be electrically connected to the smart pad 1 via the connector cable 600. In other words, electric energy may be supplied from the plug receptacle to the first port 910 via the adaptor 2 and from the first port 910 to the smart pad 1 via the second port 920 and the connector cable 600. In this case, ends of the connector cable 600 connecting the second port 920 and the smart pad 1 may have the same USB ports.

The integrated cash drawer may supply electric energy to the smart pad 1 by using the adaptor 2. Accordingly, a structure for supplying the electric energy to the smart pad 1 may be simplified and thus production costs may be reduced.

Although FIG. 6 illustrates that the first and second ports 910 and 920 are provided at one side of the housing 810, the present invention is not limited thereto and a variety of modifications, for example, the first and second ports 910 and 920 are provided inside the housing 810 so as not to be seen from the outside, may be possible.

In the cash drawer 800, the tray 820 may open when the card reader 500 reads a credit card.

In the docking device for a credit card payment and the integrated cash drawer including the same, since the smart pad 1 is used instead of a display device and a sign pad, a structure thereof may be made simple and an aesthetic appearance may be provided. Also, since the smart pad 1 may be semi-automatically moved, user convenience may be improved.

As described above, according to the one or more of the above embodiments of the present invention, a docking device for a credit card payment having a simple structure and an aesthetic appearance, and a cash drawer including the same, may be embodied.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A docking device for a credit card payment, comprising:
   a base having a convex upper surface; and
   a support plate configured to accommodate a smart pad and to slide on the base along the convex upper surface of the base,
   wherein, when as the support plate slides from one side to the other side along the convex upper surface of the base, the smart pad accommodated on the support plate changes from one state of being inclined toward one person located at the one side to the other state of being inclined toward the other person located at the other side.

2. The docket device for a credit card payment of claim 1, further comprising a moving unit configured to move the support plate so as to semi-automatically slide.

3. The docket device for a credit card payment of claim 1, further comprising a connector cable configured to be detachably connected to the smart pad to supply electric energy and extends to the outside via the base.

4. The docket device for a credit card payment of claim 1, further comprising a plate having an upper surface to which the base is detachably coupled.

5. The docket device for a credit card payment of claim 1, further comprising a card reader configured to be connected to the smart pad.

6. The docket device for a credit card payment of claim 1, wherein the support plate is configured to move on an upper surface of the base and supports a center of mass of the smart pad.

7. A cash drawer comprising:
   a housing;
   a drawer provided in the housing; and
   a docking device for a credit card payment that is arranged on an upper surface of the housing, the docking device for a credit card payment comprising:
   a base; and
   a support plate configured to accommodate a smart pad and to slide on the base,
   wherein, when the support plate slides from one side to the other side, the smart pad accommodated on the support plate changes from one state of being inclined toward one person located at the one side to the other state of being inclined toward the other person located at the other side.

8. The cash drawer of claim 7, wherein the docking device further comprises a moving unit configured to move the support plate so as to semi-automatically slide.

9. The cash drawer of claim 7, wherein the docking device further comprises a connector cable configured to be detachably connected to the smart pad to supply electric energy and extends to the outside via the base.

10. The cash drawer of claim 7, wherein the base comprises a convex upper surface, and an inclination state of the smart pad accommodated on the support plate changes as the support plate moves along the convex upper surface of the base.

11. The cash drawer of claim 7, wherein the docking device further comprises a plate having an upper surface to which the base is detachably coupled.

12. The cash drawer of claim 7, wherein the docking device further comprises a card reader configured to be connected to the smart pad.

13. The cash drawer of claim 7, wherein the support plate is configured to move on an upper surface of the base and supports a center of mass of the smart pad.

14. The cash drawer of claim 7, further comprising:
   a first port arranged in the housing and configured to receive external electric energy; and
   a second port arranged in the housing and electrically connected to the first port, the second port configured to be electrically connected to the smart pad.

* * * * *